(12) United States Patent
Peng

(10) Patent No.: US 9,316,783 B2
(45) Date of Patent: Apr. 19, 2016

(54) OPTICAL DEVICES INCLUDING ASSISTANT LAYERS

(71) Applicant: SEAGATE TECHNOLOGY LLC, Cupertino, CA (US)

(72) Inventor: Chubing Peng, Minnetonka, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/522,872

(22) Filed: Oct. 24, 2014

(65) Prior Publication Data

US 2015/0043877 A1 Feb. 12, 2015

Related U.S. Application Data

(63) Continuation of application No. 13/792,333, filed on Mar. 11, 2013, now Pat. No. 8,873,349.

(60) Provisional application No. 61/637,560, filed on Apr. 24, 2012.

(51) Int. Cl.
G11B 11/00 (2006.01)
G02B 6/028 (2006.01)
F21V 8/00 (2006.01)
G11B 13/08 (2006.01)
G11B 5/31 (2006.01)
G11B 5/00 (2006.01)
G02B 6/122 (2006.01)

(52) U.S. Cl.
CPC .............. *G02B 6/028* (2013.01); *G02B 6/0065* (2013.01); *G11B 5/314* (2013.01); *G11B 13/08* (2013.01); *G02B 6/122* (2013.01); *G11B 2005/0021* (2013.01)

(58) Field of Classification Search
None
See application file for complete search history.

(56) References Cited

U.S. PATENT DOCUMENTS

| | | |
|---|---|---|
| 5,987,046 A | 11/1999 | Kobayashi |
| 8,200,054 B1 | 6/2012 | Li |
| 8,411,536 B1 | 4/2013 | Peng |
| 8,456,966 B1 * | 6/2013 | Shi et al. ............ 369/13.33 |
| 8,509,037 B1 * | 8/2013 | Huang et al. ............ 369/13.24 |
| 8,588,039 B1 | 11/2013 | Shi |
| 8,780,678 B2 * | 7/2014 | Iwanabe et al. ............ 369/13.33 |
| 2006/0090178 A1 | 4/2006 | Stipe |
| 2006/0143635 A1 | 6/2006 | Liu |
| 2008/0239541 A1 | 10/2008 | Shimazawa |
| 2010/0165822 A1 | 7/2010 | Balamane |
| 2010/0321815 A1 | 12/2010 | Zhou |
| 2011/0090770 A1 * | 4/2011 | Iwanabe et al. ............ 369/13.24 |
| 2012/0257490 A1 | 10/2012 | Zhou |
| 2013/0083637 A1 | 4/2013 | Peng |
| 2013/0279313 A1 * | 10/2013 | Huang et al. ............ 369/13.31 |

* cited by examiner

Primary Examiner — Tan X Dinh
(74) Attorney, Agent, or Firm — Mueting, Raasch & Gebhardt, P.A.

(57) ABSTRACT

A waveguide including a top cladding layer, the top cladding layer including a material having an index of refraction, n1; an assistant layer, the assistant layer positioned adjacent the top cladding layer, the assistant layer including a material having an index of refraction, n2; a core layer, the core layer positioned adjacent the assistant layer, the core layer including a material having an index of refraction, n3; and a bottom cladding layer, the bottom cladding layer positioned adjacent the core layer, the bottom cladding layer including a material having an index of refraction, n4, wherein n1 is less than both n2 and n3, n3 is greater than n1 and n4, and n4 is less than n3 and n2.

20 Claims, 5 Drawing Sheets

OPTICAL DEVICES INCLUDING ASSISTANT LAYERS

PRIORITY

This application is a continuation application of U.S. application Ser. No. 13/792,333, filed Mar. 11, 2013, which claims priority to U.S. Provisional Application No. 61/637,560 entitled "OPTICAL WAVEGUIDE FOR HEAT ASSISTED MAGNETIC RECORDING" filed on Apr. 24, 2012, the disclosure of which is incorporated herein by reference thereto.

BACKGROUND

In thermally assisted magnetic/optical recording, information bits are recorded to a storage layer of a storage media at elevated temperatures. Generally, a spot or bit on the storage medium is heated to reduce its coercivity sufficiently so that an applied magnetic field or optical write signal can record data to the storage medium. Current methods of heating the storage media include directing and focusing energy onto the storage media. Different and more advantageous methods and devices for focusing the energy are needed in order to decrease the size of the heated spot in order to increase the storage density of the storage media.

SUMMARY

A waveguide including a top cladding layer, the top cladding layer including a material having an index of refraction, $n1$; an assistant layer, the assistant layer positioned adjacent the top cladding layer, the assistant layer including a material having an index of refraction, $n2$; a core layer, the core layer positioned adjacent the assistant layer, the core layer including a material having an index of refraction, $n3$; and a bottom cladding layer, the bottom cladding layer positioned adjacent the core layer, the bottom cladding layer including a material having an index of refraction, $n4$, wherein $n1$ is less than both $n2$ and $n3$, $n3$ is greater than $n1$ and $n4$, and $n4$ is less than $n3$ and $n2$.

A device including a magnetic pole; a near field transducer-heat sink (NFT-HS), the NFT-HS positioned adjacent the magnetic pole, the NFT-HS having an air bearing surface and an opposing back surface; and a waveguide, the waveguide including a top cladding layer, the top cladding layer including a material having an index of refraction, $n1$; an assistant layer, the assistant layer positioned adjacent the top cladding layer, the assistant layer including a material having an index of refraction, $n2$; a core layer, the core layer positioned adjacent the assistant layer, the core layer including a material having an index of refraction, $n3$; and a bottom cladding layer, the bottom cladding layer positioned adjacent the core layer, the bottom cladding layer including a material having an index of refraction, $n4$, wherein $n1$ is less than both $n2$ and $n3$, $n3$ is greater than $n1$ and $n4$, and $n4$ is less than $n3$ and $n2$, wherein the top cladding layer of the waveguide is positioned adjacent the magnetic pole and the back surface of the NFT-HS and the assistant layer of the waveguide is positioned adjacent the back surface of the NFT-HS.

Also disclosed is a device that includes a light source; and a waveguide, the waveguide including: a top cladding layer, the top cladding layer including a material having an index of refraction, $n1$; an assistant layer, the assistant layer positioned adjacent the top cladding layer, the assistant layer including a material having an index of refraction, $n2$; a core layer, the core layer positioned adjacent the assistant layer, the core layer including a material having an index of refraction, $n3$; and a bottom cladding layer, the bottom cladding layer positioned adjacent the core layer, the bottom cladding layer including a material having an index of refraction, $n4$, wherein $n1$ is less than both $n2$ and $n3$, $n3$ is greater than $n1$ and $n4$, and $n4$ is less than $n3$ and $n2$, and wherein the waveguide is configured to receive light from the light source and direct it out into the NFT-HS.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Disclosed devices can offer the advantage of providing more efficient transfer of energy from an energy source to the magnetic storage media to be heated, a smaller focal point at the point of heating, or some combination thereof. In some embodiments, disclosed devices can be used within other devices or systems, such as magnetic recording heads, more specifically, thermally or heat assisted magnetic recording (HAMR) heads, or disc drives that include such devices.

Figure 1:
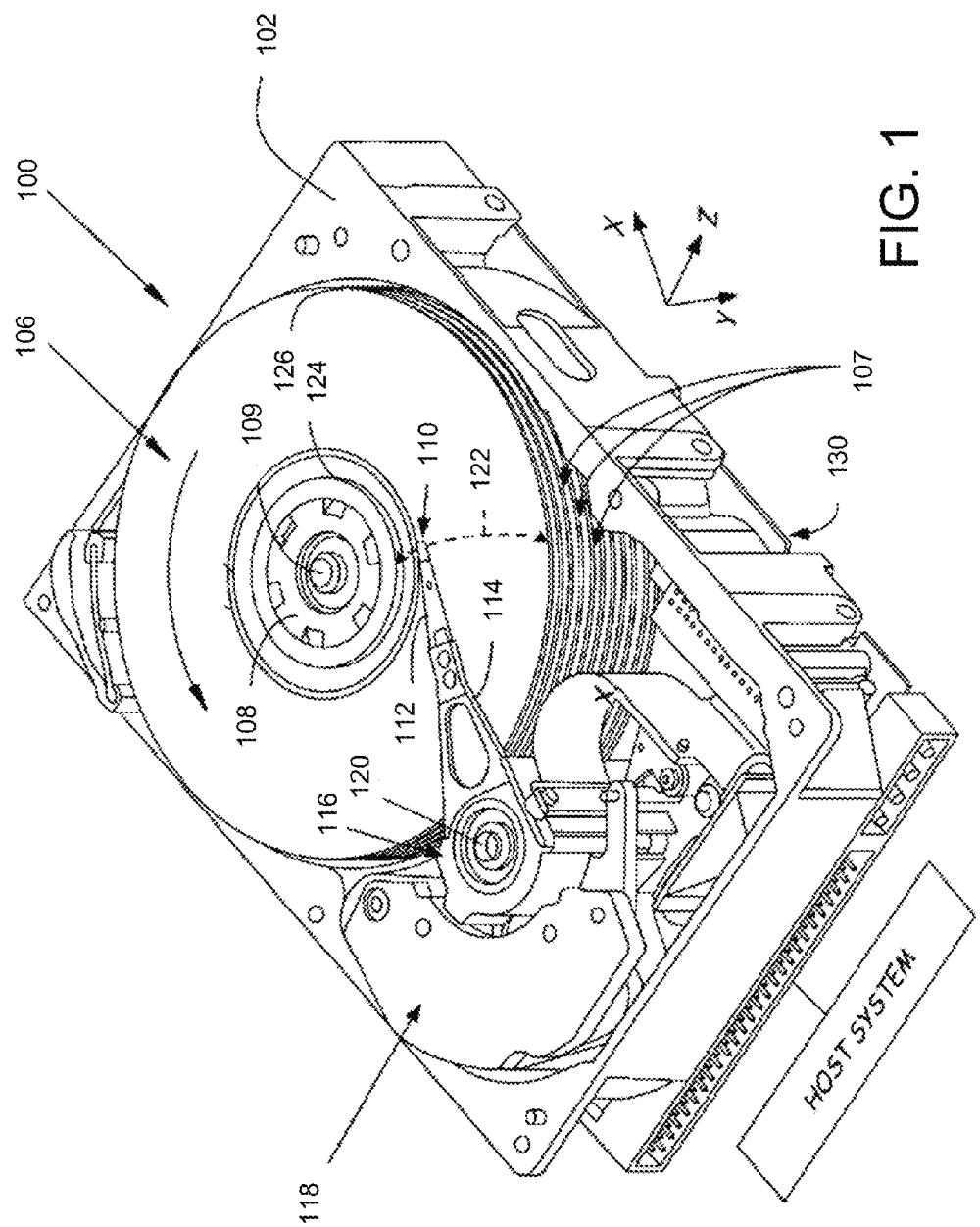
FIG. 1 is an isometric view of a system including a disc drive.

FIG. 1 is an isometric view of a disc drive 100 in which disclosed devices such as disclosed optical devices may be useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

In general, the disc head slider 110 supports a recording head that can include disclosed optical devices. Disclosed optical devices included in the disc head slider 110 can be utilized to direct focused energy onto a surface of a disc 107 of the disc pack 106 to provide heat-assisted recording. A control circuit included with the servo electronics 130 or co-located with the servo electronics 130 along a bottom portion of the disc drive 100 may be used to control a position of the slider 110 and the associated read/write head relative to one of the individual discs 107 of the disc pack 106.

Figure 2:
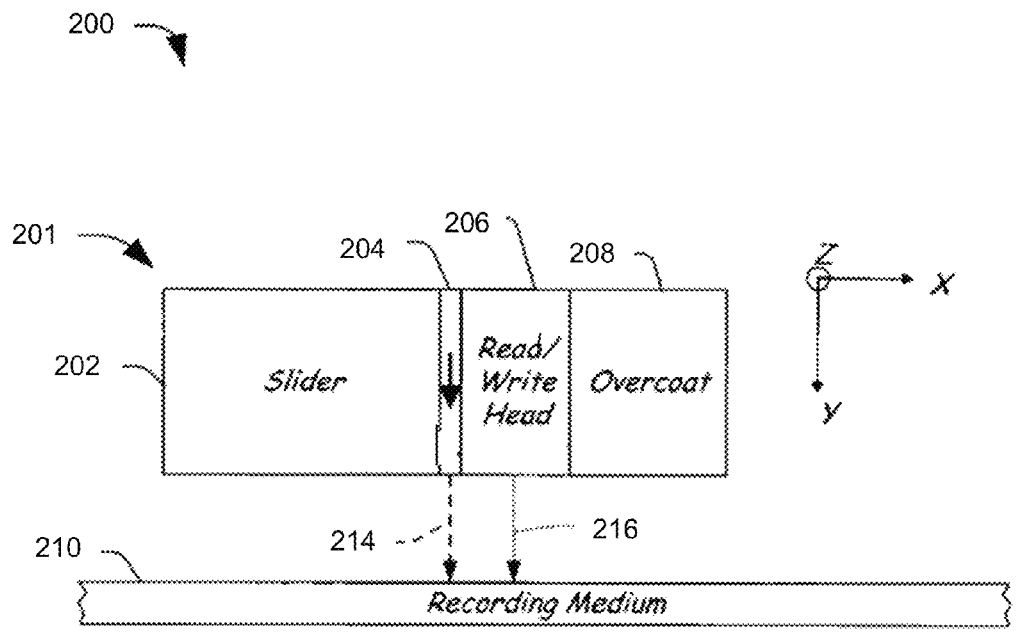
FIG. 2 is a block diagram of a particular illustrative embodiment of a recording head including a waveguide in communication with an illustrative recording medium.

FIG. 2 is a block diagram of a particular illustrative embodiment of a system 200 including a recording head 201 having an optical device 204 such as those depicted herein. The system 200 includes a recording medium 210 located perpendicular to a Y-axis of the optical device 204. The recording head 201 includes an air-bearing slider 202 that flies over the surface of the recording medium 210 and that is adapted to be adjusted in the X-direction and the Z-direction and that maintains a fly-height over the surface of the recording medium 210 in the Y-direction based on airflow. The air-bearing slider 202 is coupled to a read/write head 206, which is adjacent to the optical device 204. The optical device 204 focuses evanescent waves energy toward the surface of the recording medium 210. The recording head 201 can optionally include overcoat layer 208 that functions to protect the read/write head 206.

In a particular embodiment, the optical device directs focused energy 214 onto the surface of the recording medium 210 to heat a local area of the recording medium 210 to reduce a coercivity of the local area. Concurrently, the read/write head 206 directs a recording field 216 onto the recording medium 210 in the heated local area to record data to the recording medium.

Figure 3:
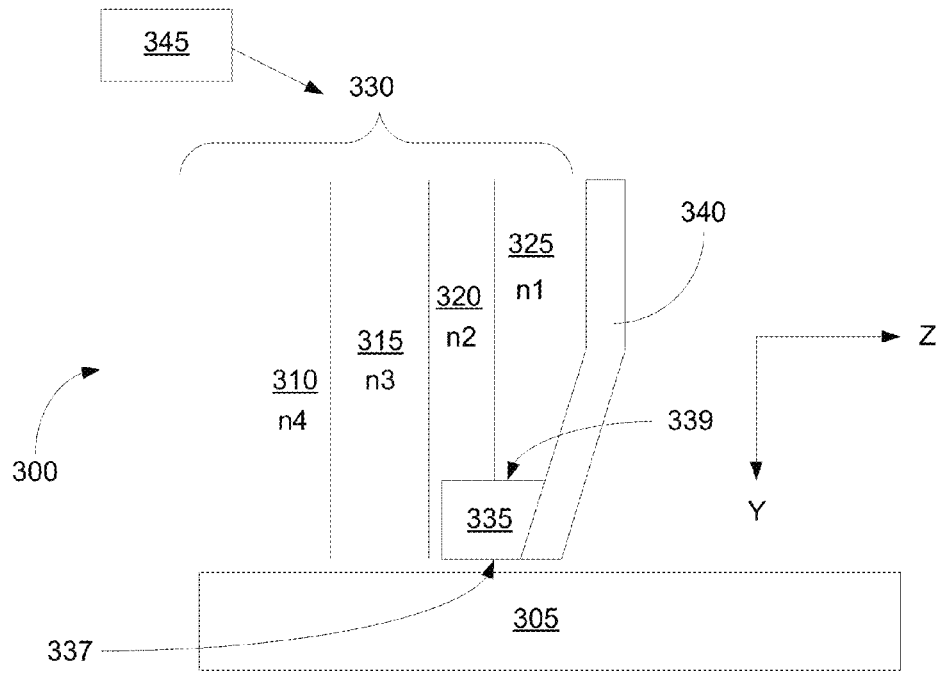
FIG. 3 is a partial cross section of a disclosed device.

FIG. 3 shows a device 300. The device 300 can generally include a waveguide, or an optical waveguide 330. The waveguide 300 can include a bottom cladding layer or structure 310, a core layer or structure 315, a top cladding layer or structure 325 and an assistant layer or structure 320. The bottom cladding layer 310 can generally be positioned adjacent the core layer 315. The assistant layer 320 can generally be positioned adjacent the core layer 315 and the top cladding layer 325. Stated another way, the assistant layer 320 can be positioned between the core layer 315 and the top cladding layer 325; the core layer 315 can be positioned between the bottom cladding layer 310 and the assistant layer 320. Generally, the waveguide 330 can also be described as a multilayer structure that includes the bottom cladding layer 310, the core layer 315, the assistant layer 320 and the top cladding layer 325.

The top cladding layer 325 generally includes or can be made of a material that has an index of refraction, n1. The assistant layer 320 generally includes or can be made of a material that has an index of refraction, n2. The core layer 315 generally includes or can be made of a material that has an index of refraction, n3. In some embodiments, discussed herein below, the core layer 315 can itself be a multilayer structure. The bottom cladding layer 310 generally includes or can be made of a material that has an index of refraction, n4.

Generally, the relationship of the indices of refraction of the various layers can be described in more detail. Generally, n1 is not greater than, and in some embodiments less than both n2 and n3; n1 can be less than, equal to, or greater than n4. Generally, n3 is not less than, and in some embodiments greater than both n1 and n4; n3 can be less than, equal to, or greater than n2. Generally, n4 is not greater than, and in some embodiments less than n3 and n2; n4 can be less than, equal to, or greater than n1. In some embodiments, n2 can be not less than and optionally greater than n1; n2 can be less than, equal to, or greater than n3; n2 can be not less than and optionally greater than n4.

The material of the core layer 315 may have a refractive index greater than the material of either or both of the bottom and top cladding layers 310 and 325. This enables the core layer 315 to more efficiently transmit the light energy or electromagnetic wave for heating the recording medium. In some embodiments, the material of the core layer 315 may have a refractive index (n3) of about 1.9 to about 4.0. In contrast, the material of the either or both of the bottom and top cladding layers 310 and 325 may have a refractive index of about 1.0 to about 2.0. By forming the core layer 315 with a higher refractive index than the cladding layers, the core layer 315 is able to more efficiently guide a propagating or guided electromagnetic planar waveguide mode by total internal reflection. In some embodiments, by increasing the ratio of the core layer 315 refractive index to the cladding layers' refractive index (for the refractive index ranges stated herein), the energy of the propagating or guided mode can be more greatly confined within the core layer 315. As used herein, the term propagating or guided electromagnetic planar waveguide mode generally refers to optical modes which are presented as a solution of the eigenvalue equation, which is derived from Maxwell's equations subject to the boundary conditions generally imposed by the waveguide geometry.

In some embodiments, the bottom cladding layer 310 may be formed of a material such as, for example $SiO_2$, $MgF_2$, $Al_2O_3$, porous silica, or combinations thereof. In some embodiments, the bottom cladding layer 310 can be formed of a material that has advantageous properties, for example, the material can have advantageous corrosion resistant properties. Corrosion resistance can be important because the bottom cladding layer 310 is exposed to the air bearing surface (ABS) of the device. In some embodiments, the bottom cladding layer can be made of $SiO_2$, for example. In some embodiments, the top cladding layer 325 may be formed of a material such as, for example $SiO_2$, $MgF_2$, $Al_2O_3$, porous silica, or combinations thereof. The top and bottom cladding layers can be the same or different materials.

In some embodiments, the core layer 315 may be formed of a material such as, for example, $Ta_2O_5$, $TiO_x$, ZnSe, ZnS, Si, SiN, GaP, GaN, diamond, or combinations thereof. In some embodiments, the core layer 315 may be formed of a material such as, for example $Ta_2O_5$, $SiN_x$, $TiO_x$, diamond, or combinations thereof. In some embodiments, discussed below, the core layer 315 can be made of a multilayer structure.

In some embodiments, the assistant layer 320 may be formed of a material such as, for example, $SiON_x$, $Yb_2O_3$, $Y_2O_3$, $Ta_2O_5$ ($TaO_x$), $TaSiO_2$ ($TaSiO_x$), $Hf_2O_3$, $Nb_2O_3$ ($NbO_x$), AlN, or combinations thereof. In some embodiments, the assistant layer 320 may be formed of $Y_2O_3$, for example.

The optical waveguide 330 can be positioned adjacent other structures, and in embodiments can be configured to work in connection with other structures or devices. The embodiment of the optical waveguide 330 depicted in FIG. 3 is configured adjacent a magnetic pole 340, and a near field transducer-heat sink (NFT-HS).

In some embodiments, the core layer 315 may have a thickness, in the z direction (see FIG. 3), of 20 nm to 500 nm. The bottom cladding layer 310 may have a thickness in the z direction, of 200 nm to 2000 nm. The bottom cladding layer 310 should be sufficiently thick such that the electric field from the propagating waveguide mode does not extend appreciably beyond the bottom cladding layer 310 and thereby interact with any materials or structure outside of the waveguide 330. In some embodiments, increasing the ratio of the core layer 315 thickness to the bottom cladding layer 310 thickness (for the thickness ranges stated herein), the energy of the propagating mode can be more greatly confined within the core layer 315.

In some embodiments, the thickness of the assistant layer 320 can be dependent on other structures positioned adjacent the assistant layer, adjacent the waveguide 330, or a combination thereof. The thickness of the top cladding layer 320 can be dependent on other structures positioned adjacent the assistant layer, adjacent the waveguide 330, or a combination thereof.

The device 300 depicted in FIG. 3 includes not only an optical waveguide 330, but also a near field transducer-heat sink (referred to herein as NFT-HS) 335 and a magnetic pole 340. The NFT-HS can be a single structure that functions as both a near field transducer and a heat sink or it can be a multi-part structure which as a whole functions as a near field transducer and a heat sink. In some embodiments, the NFT-HS can be a peg/disc type of NFT, which can also be referred to as a lollipop structure, a gap type of NFT, or a funnel-type NFT for example. The near field transducer function of the NFT-HS functions to condense incoming light rays to a location on the magnetic media disc 305, while the heat sink function of the NFT-HS functions to funnel heat, which is generated by the NFT function, away from the NFT structure. The NFT-HS 335 can be described as having an air bearing surface 337. The air bearing surface 337 is adjacent the magnetic media disc 305. The NFT-HS 335 also has a back surface 339, which is the opposite or opposing surface as the air bearing surface 337. The magnetic pole 340 can generally function as a write pole in a read-write head. Although the examples discussed herein depict perpendicular magnetic recording heads, it will be appreciated that the embodiments depicted herein may also be used in conjunction with other types of recording heads and/or storage media where it may be useful to employ heat assisted magnetic recording.

The location of some of the components of the waveguide 330 can be further described with respect to the location of the NFT-HS 335 and the magnetic pole 340. The position of the top cladding layer 325 can be described as being positioned adjacent the back surface 339 of the NFT-HS 335. The positioned of the top cladding layer 325 can also be described as being positioned adjacent the magnetic pole 340. In some embodiments, the top cladding layer 325 can extend beyond (in the z direction) the magnetic pole 340. In some embodiments, the top cladding layer 325 can at least fill a region defined by the assistant layer 320, the back surface 330 of the NFT-HS 335 and the magnetic pole 340. In such embodiments, the thickness of the top cladding layer 325 would therefore be defined, or limited by the structures surrounding it. The position of the assistant layer 320 can also be further described with respect to the location of the NFT-HS 335. The position of the assistant layer 320 can be described as being positioned adjacent the back surface 330 of the NFT-HS 335.

The thickness of the assistant layer 320 and the top cladding layer 325 can also be described with respect to adjacent structures. For example, if the NFT-HS is described as having a height (in the z direction, or stated another way, parallel to the ABS), the thickness of the assistant layer 320 (in the z direction) can be described with respect to the height of the NFT-HS. In some embodiments, the assistant layer 320 has a thickness that is not greater than half the height of the NFT-HS. In some embodiments, the assistant layer 320 can have a thickness that is less than half the height of the NFT-HS. In some embodiments, a NFT-HS can have a height of 200 nm. In such embodiments, the assistant layer 320 can have a thickness of not greater than 100 nm. In some embodiments, the assistant layer 320 can have a thickness from 40 nm to 80 nm.

The inclusion of the assistant layer in disclosed optical waveguides can function to push the waveguide mode field into the NFT. When using configurations such as those disclosed herein, the field will decay quickly away from the top cladding layer, thereby lowering light absorption in the NFT-HS and magnetic pole. Lower light absorption results in a lower temperature rise and concomitant enhanced reliability. Disclosed waveguides can also allow the NFT to be tuned at the resonance in the environment of the assistant layer where the bottom part and peg (in the embodiment of a lollipop type NFT) is immersed, which can contribute to the energy transfer to the magnetic media. The top part of the NFT is immersed in the top cladding layer, where the NFT is off resonance. Such an arrangement can force the plasmonic surface wave to be efficiently generated in the bottom part of the NFT and be funneled to the peg. The lower field (off-resonance) in the top reduces the light absorption in the NFT and also the magnetic pole behind it. The use of the assistant layer in combination with the top cladding layer can also be effective to reduce the absorption in the magnetic pole outside the NFT region, where transversely polarized solid immersion mirrors (SIMs) exist.

The device depicted in FIG. 3 also includes a light source 345. The light source 345 is configured to generate light, which is directed into the optical waveguide 330. More specifically, the light source 345 and optical waveguide 330 are configured so that light from the light source is received by the waveguide and directed out the waveguide into the NFT-HS. Other devices and structures not depicted herein could be utilized to direct the light from the light source 345 into the optical waveguide 330. Exemplary types of structures or devices can include, for example, solid immersion mirrors including parabolic mirrors for example, mode index lenses, and three-dimensional channel waveguides. Exemplary types of light sources can include, for example laser diodes, light emitting diodes (LEDs), edge emitting laser diodes (EELs), vertical cavity surface emitting lasers (VCSELs), and surface emitting diodes.

Figure 4:
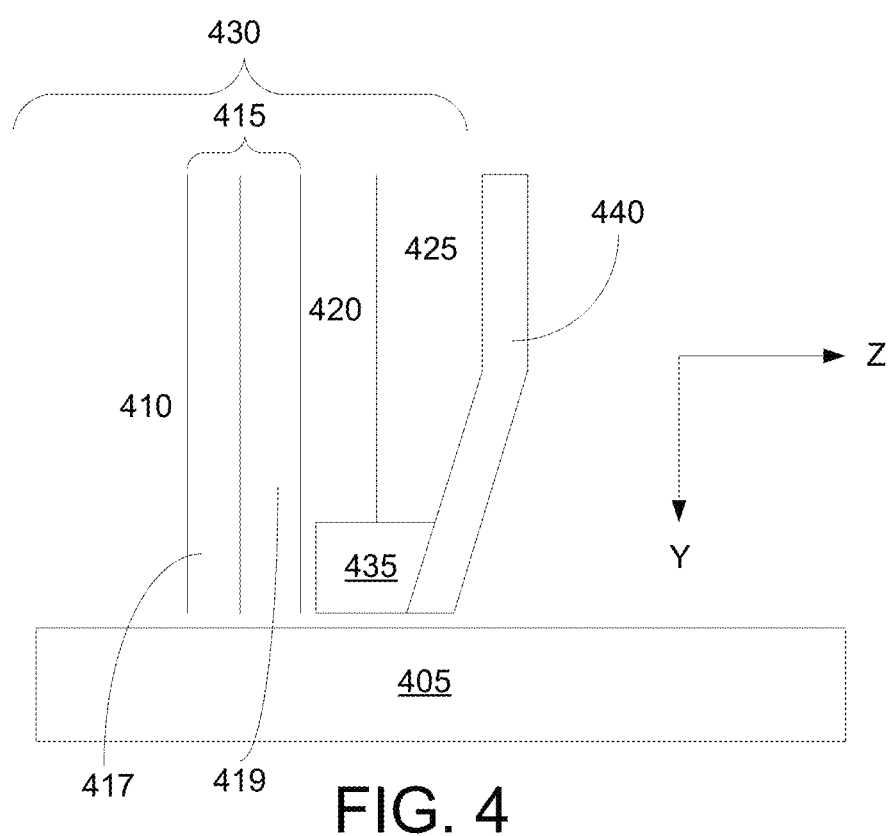
FIG. 4 is a partial cross section of a disclosed device.

FIG. 4 depicts an embodiment of a device 400 that includes a core layer 415 that includes more than one layer. Such a laminated core layer 415 can be referred to as a laminated core layer. In such a laminated core layer, the lower core layer 417 includes a material with a lower index of refraction (relative to the upper core layer) and is adjacent the bottom cladding layer 410 and an upper core layer 419 includes a material with a higher index of refraction (relative to the lower core layer) and is adjacent the assistant layer 420. Such a waveguide 430 can also include a top cladding layer 425. The disclosed device also includes a NFT-HS 435 and a magnetic pole 440. The magnetic media 405 is also illustrated in FIG. 4. Example of laminated core layers can be found in commonly assigned U.S. Pat. No. 8,509,037 issued on Aug. 13, 2013, which is based on U.S. patent Ser. No. 13/454,999, entitled "LAYERED OPTICAL WAVEGUIDE AND NEAR FIELD TRANSDUCER", filed on Apr. 24, 2012, the disclosure of which is incorporated herein by reference thereto.

Figure 5:
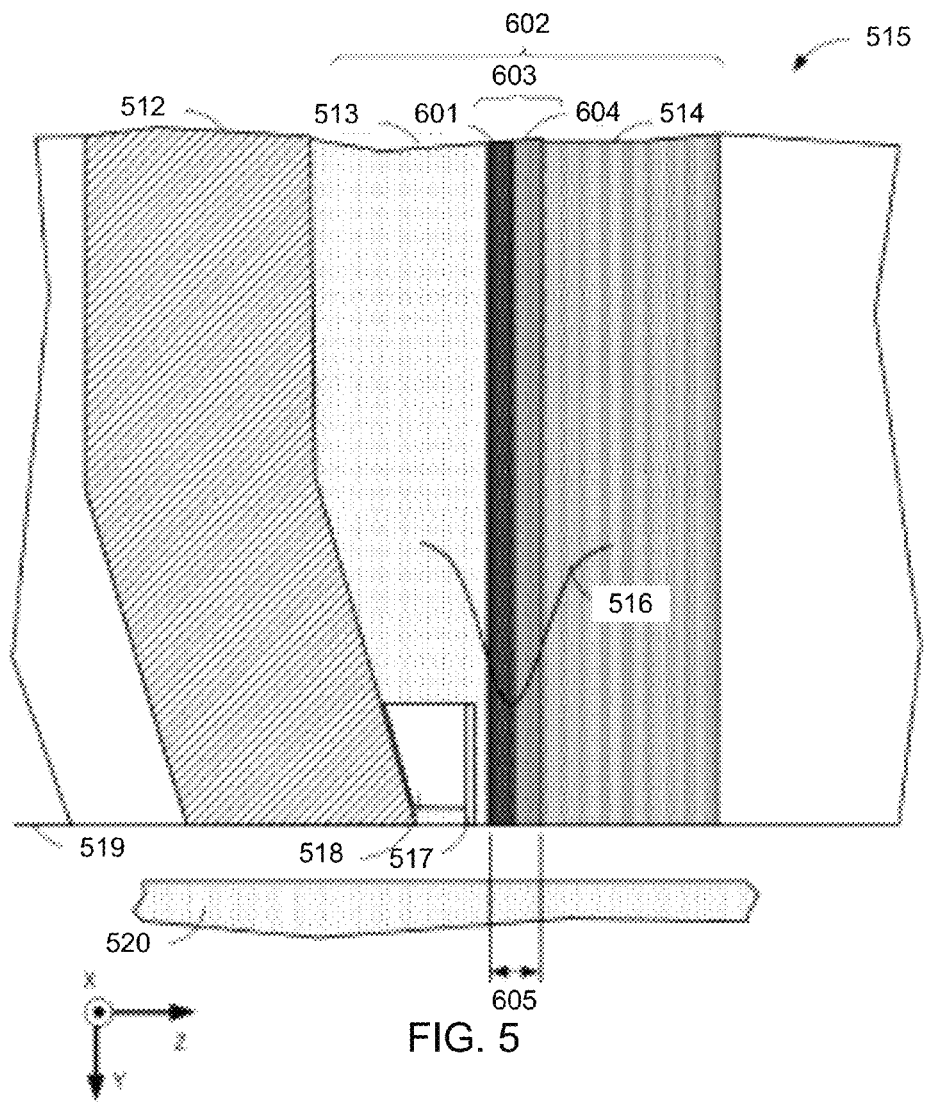
FIG. 5 is a cross-sectional view of a waveguide, write pole, and near-field transducer according to an example embodiment.

In the arrangement shown in FIG. 5, the following reference numerals refer to the following elements: the ABS 519, the read write head/515, the surface of the magnetic medium 520, e.g, a magnetic disk, the waveguide 602, the electromagnetic energy 516, the magnetic write pole 512, the heatsink 518, the NFT 517. In FIG. 5, the waveguide 602 includes a core 603 with multiple layers of different index material (e.g., double layer core or index gradient core). The top and bottom claddings 513, 514 may be of differing index materials as described above. For example, top cladding layer 513 may have a higher index of refraction than bottom cladding layer 514. Generally, the layers of core 603 may each include indices of refraction that are ordered from largest to smallest based on respective proximity to the top and bottom cladding layers 513, 514.

In the arrangement shown in FIG. 5, the core 603 may be formed from a first layer 604 of lower index material such as $Ta_2O_5$ (n=2.1) near the bottom cladding 514, and a second layer 601 of higher index material such as $TiO_2$ or $Nb_2O_5$ (n=2.4) near the top cladding 513. If the thickness 605 of the core 602 is on the order of 125 nm, then the core may support single mode optical propagation. For example, if the thickness of the lower index layer 604 is around 90 nm, and around 40 nm for the higher index layer 601 (for a total thickness 310 of around 130 nm), the excitation portion of the NFT 517 may receive up to 31% more energy from the wave-front compared to a single core structure.

Figure 6:
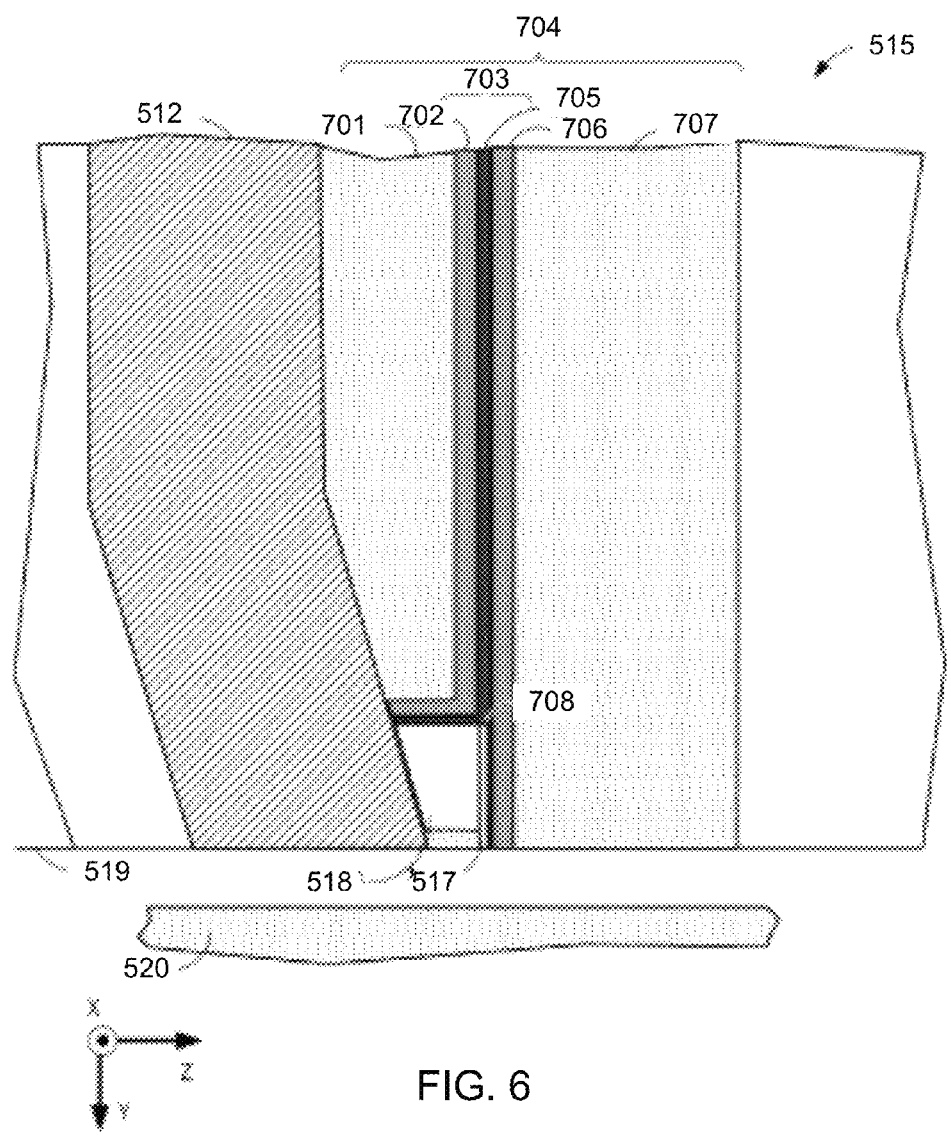
FIG. 6 is a cross-sectional view of a waveguide, write pole, and near-field transducer according to another example embodiment.

In reference now to FIG. 6 (in which like reference numerals refer to like components unless otherwise mentioned herein), a waveguide and NFT arrangement is illustrated according to another example embodiment. In this example, a waveguide 704 includes top and bottom cladding layers 701, 707 both using a low index material such as $SiO_2$ (n=1.47). Between these layers 701, 707 is a core 703 formed from a "sandwich" with a middle layer 705 (e.g., $Al_2O_3$ or $SiO_xN_y$, n=1.65) surrounded with a higher index first and second outside core layers 702, 706 ($TiO_2$ or $Nb_2O_5$, n=2.4). All of the layers 705, 702, 706 may be substantially the same thickness in the z-direction, e.g., 40 nm. The middle layer 705 (as well as outside core layer 702) optionally extends over a back edge of the NFT 517, e.g., edge 708 that faces away from the media-facing surface (e.g., the ABS 519).

The present disclosure is illustrated by the following examples. It is to be understood that the particular examples, assumptions, modeling, and procedures are to be interpreted broadly in accordance with the scope and spirit of the invention as set forth herein.

EXAMPLES

To demonstrate a disclosed optical waveguide, various waveguides and comparative waveguides were modeled. A comparative waveguide (C1) included a 125 nm thick $Ta_2O_5$ core layer having an index of refraction, n=2.08; top and bottom cladding layers of $Al_2O_3$ having an index of refraction, n=1.65; a lollipop NFT composed of a gold (n=0.188+j 5.39) peg (peg dimension=40 nm along×direction–cross track; by 32 nm along z direction–down track) and disc (cylinder diameter 200 nm); and a sloped FeCo magnetic pole (n=3.17+j 3.95) located behind (a strip 250 nm wide along the x direction and 100 nm high along the z direction, sloped at 26.56° from the x direction). The NFT-pole spacing on the air bearing surface was 20 nm. The media consisted of a 12.6 nm thick Fe layer (n=2.94+j 3.41), a 10 nm MgO layer (n=1.70) and a 60 nm Cu layer (n=0.26+j 5.29) on a glass substrate (n=1.50). The light wavelength in vacuum λ=830 nm.

Another comparative waveguide (C2) was exactly the same as C1, but replaced the bottom cladding layer with $SiO_2$. This was intended to push the field into the top cladding layer. A first exemplary disclosed waveguide (Ex. 1) was exactly the same as C2 except that the top cladding layer was replaced with a top cladding layer-assistant layer structure. The assistant layer structure was 70 nm thick $Y_2O_3$ with an index of refraction, n=1.80. A second exemplary disclosed waveguide (Ex. 2) was exactly the same as Ex. 1 except that the $Al_2O_3$ top cladding was replaced with $SiO_2$.

Table 1 shows the results of modeling. CE50 is the light absorption in the Fe layer in a footprint of 50 nm by 50 nm. The absorption includes the total absorption in the NFT and magnetic pole. The FOM (figure of merit) is defined as the CE50/absorption, which is a measure of heads performance.

TABLE 1

| | | CE relative | FOM | $CE_{50}$ | Absorption | Waveguide structure |
|---|---|---|---|---|---|---|
| C1 | 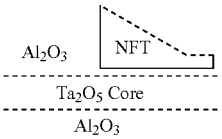 | 1 | 0.082 | 0.0115 | 0.14 | $Al_2O_3/Ta_2O_5/Al_2O_3$ |

TABLE 1-continued

| | | CE relative | FOM | CE$_{50}$ | Absorption | Waveguide structure |
|---|---|---|---|---|---|---|
| C2 | Al$_2$O$_3$ / NFT / Ta$_2$O$_5$ Core / SiO$_2$ | 1.19 | 0.074 | 0.0137 | 0.185 | SiO$_2$/Ta$_2$O$_5$/ Al$_2$O$_3$ |
| Ex. 1 | Al$_2$O$_3$ / Y$_2$O$_3$ / NFT / Ta$_2$O$_5$ Core / SiO$_2$ | 1.626 | 0.099 | 0.0187 | 0.189 | SiO$_2$/Ta$_2$O$_5$/Y$_2$O$_3$ (n = 1.80, 70-nm thick)/ Al$_2$O$_3$ |
| Ex. 2 | SiO$_2$ / Y$_2$O$_3$ / NFT / Ta$_2$O$_5$ Core / SiO$_2$ | 1.748 | 0.122 | 0.0201 | 0.164 | SiO$_2$/Ta$_2$O$_5$/Y$_2$O$_3$ (n = 1.80, 70-nm thick)/ SiO$_2$ |

As seen from Table 1, all of C1, Ex. 1 and Ex. 2 have better NFT efficiency that C1. One cause for this improvement is the replacement of the Al$_2$O$_3$ bottom cladding with SiO$_2$. This pushes the field into the top cladding layer. Ex. 1 and 2 have even better NFT efficiency, due to the addition of the assistant layer structure of the high index Y$_2$O$_3$. C2 has better CE50, but a poorer FOM, which is generally not desired. The assistant layer improves both the NFT efficiency and the figure of merit (FOM). Ex. 2 has an efficiency improvement of about 1.8 times and a figure of merit (FOM) improvement of about 1.5 times.

NFT efficiency could be further improved by using a multilayer core. An example of such a multilayer core would be a bilayer of Ta$_2$O$_5$ and TiO$_2$. The Ta$_2$O5 has a lower index of refraction than the TiO2, further pushing the field into the top cladding layer, thereby increasing NFT efficiency. However, the figure of merit (FOM) may not be correspondingly improved. A specific example would be the same as Ex. 2, but replacing the core layer with a bi layer of 40 nm thick Ta$_2$O$_5$ and 40 nm thick TiO$_2$ (n=2.30). The CE relative=2.226, but the figure of merit (FOM)=0.119, which is lower than Ex. 2 in Table 1.

Thus, embodiments of optical devices including assistant layers are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A waveguide comprising:
a top cladding layer, the top cladding layer comprising a material having an index of refraction, n1;
an assistant layer, the assistant layer positioned adjacent the top cladding layer, the assistant layer comprising a material having an index of refraction, n2;
a core layer, the core layer positioned adjacent the assistant layer, the core layer comprising a lower core layer having a lower core layer index of refraction and an upper core layer having an upper core layer index of refraction, wherein the upper core layer is adjacent the assistant layer and; and
a bottom cladding layer comprising a material having an index of refraction, n4, and wherein the lower core layer is positioned adjacent the bottom cladding layer wherein n1 is less than n2, and n4 is less n2.

2. The waveguide according to claim 1, wherein the lower core layer index of refraction is less than the upper core layer index of refraction.

3. The waveguide according to claim 2, wherein both the lower core layer index of refraction and the upper core layer index of refraction are higher than n1 and n4.

4. The waveguide according to claim 1, wherein the lower core layer Ta$_2$O$_5$ and the upper core layer comprises TiO$_2$ or Nb$_2$O$_5$.

5. The waveguide according to claim 1, wherein the core layer further comprises a middle layer positioned between the lower core layer and the upper core layer.

6. The waveguide according to claim 1, wherein the assistant layer has a thickness from about 40 nm to about 80 nm.

7. The waveguide according to claim 1, wherein the assistant layer comprises SiON$_x$, Yb$_2$O$_3$, Y$_2$O$_3$, Nb$_2$O$_3$, AlN, Al$_2$O$_3$, or combinations thereof.

8. The waveguide according to claim 1, wherein the assistant layer comprises Y$_2$O$_3$.

9. The waveguide according to claim 1, wherein the top cladding layer comprises SiO$_2$, Al$_2$O$_3$, MgF$_2$, porous silica, or combinations thereof.

10. The waveguide according to claim 1, wherein the top cladding layer comprises SiO$_2$, the assistant layer comprises Y$_2$O$_3$, and the bottom cladding layer comprises SiO$_2$.

11. An apparatus comprising:
a magnetic pole;
a near field transducer-heat sink (NFT-HS), the NFT-HS positioned adjacent the magnetic pole, the NFT-HS having an air bearing surface and an opposing back surface; and
a waveguide, the waveguide comprising:
a top cladding layer, the top cladding layer comprising a material having an index of refraction, n1;

an assistant layer, the assistant layer positioned adjacent the top cladding layer, the assistant layer comprising a material having an index of refraction, n2;

a core layer, the core layer positioned adjacent the assistant layer, the core layer comprising a lower core layer having a lower core layer index of refraction and an upper core layer having an upper core layer index of refraction, wherein the upper core layer is adjacent the assistant layer and; and a bottom cladding layer comprising a material having an index of refraction, n4, and wherein the lower core layer is positioned adjacent the bottom cladding layer wherein n1 is less than n2, and n4 is less n2, wherein the top cladding layer of the waveguide is positioned adjacent the magnetic pole and the back surface of the NFT-HS and the assistant layer of the waveguide is positioned adjacent the back surface of the NFT-HS.

12. The apparatus according to claim 11, wherein the NFT-HS has a height parallel to its air bearing surface, and a thickness of the assistant layer is not greater than half the height of the NFT-HS.

13. The apparatus according to claim 12, wherein the NFT-HS has a height of about 200 nm.

14. The apparatus according to claim 13, wherein the assistant layer has a thickness of not greater than about 100 nm.

15. The apparatus according to claim 13, wherein the assistant layer has a thickness from about 40 nm to about 80 nm.

16. The apparatus according to claim 10, wherein the top cladding layer completely fills a region defined by the back surface of the NFT-HS, the assistant layer and the magnetic pole.

17. A device comprising:
a light source;
a near field transducer-heat sink (NFT-HS); and
a waveguide, the waveguide comprising:
a top cladding layer, the top cladding layer comprising a material having an index of refraction, n1;
an assistant layer, the assistant layer positioned adjacent the top cladding layer, the assistant layer comprising a material having an index of refraction, n2;
a core layer, the core layer positioned adjacent the assistant layer, the core layer comprising a lower core layer having a lower core layer index of refraction and an upper core layer having an upper core layer index of refraction, wherein the upper core layer is adjacent the assistant layer and; and
a bottom cladding layer comprising a material having an index of refraction, n4, and wherein the lower core layer is positioned adjacent the bottom cladding layer wherein n1 is less than n2, and n4 is less n2, and
wherein the waveguide is configured to receive light from the light source and direct it out into the NFT-HS.

18. The device according to claim 17, wherein the light source is a laser diode, a light emitting diode (LED), an edge emitting laser diode (EEL), a vertical cavity surface emitting laser (VCSEL), or a surface emitting diode.

19. The device according to claim 17, wherein the top cladding comprises $SiO_2$, $MgF_2$, $Al_2O_3$, porous silica, or combinations thereof; the assistant layer comprises $SiON_x$, $Yb_2O_3$, $Y_2O_3$, $NbO_x$, $AlN$, $Hf_2O_3$, $TaSiO_x$, $TaO_x$, $Al_2O_3$, or combinations thereof; the core layer comprises $Ta_2O_5$, $SiN_x$, $ZnS$, $TiO_x$, diamond, or combinations thereof; and the bottom cladding layer comprises $SiO_2$, $MgF_2$, $Al_2O_3$, porous silica, or combinations thereof.

20. The device according to claim 17, wherein the top cladding layer comprises $SiO_2$, the assistant layer comprises $Y_2O_3$, and the bottom cladding layer comprises $SiO_2$.

* * * * *